United States Patent
Kyou (10) Patent No.: US 11,564,176 B2
(45) Date of Patent: Jan. 24, 2023

(54) WIRELESS COMMUNICATION DEVICE, ELECTRONIC TIMEPIECE, WIRELESS COMMUNICATION METHOD, AND STORAGE MEDIUM

(71) Applicant: CASIO COMPUTER CO., LTD., Tokyo (JP)

(72) Inventor: Kazuho Kyou, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/145,327

(22) Filed: Sep. 28, 2018

(65) Prior Publication Data

US 2019/0104479 A1 Apr. 4, 2019

(30) Foreign Application Priority Data

Oct. 2, 2017 (JP) .............................. JP2017-192660

(51) Int. Cl.
*H04W 52/22* (2009.01)
*H04W 52/28* (2009.01)
(Continued)

(52) U.S. Cl.
CPC ............ *H04W 52/22* (2013.01); *G04R 20/26* (2013.01); *H04W 52/281* (2013.01);
(Continued)

(58) Field of Classification Search
CPC ..... H04W 52/22; H04W 4/80; H04W 52/281; H04W 52/288; H04W 52/0216;
(Continued)

(56) References Cited

U.S. PATENT DOCUMENTS 9,462,623 B2* 10/2016 Jakusovszky ....... H04W 72/005
9,532,312 B1* 12/2016 Kim .................. H04W 52/0277
(Continued)

FOREIGN PATENT DOCUMENTS

JP 2012-142877 A 7/2012
JP 2016-012852 A 1/2016
(Continued)

OTHER PUBLICATIONS

Townsend, K. et al., "Getting Started with Bluetooth Low Energy", O'Reilly Media, May 12, 2014, pp. 15-50.
(Continued)

*Primary Examiner* — Lester G Kincaid
*Assistant Examiner* — Maryam Soltanzadeh
(74) *Attorney, Agent, or Firm* — Scully Scott Murphy & Presser (57) ABSTRACT

A wireless communication device includes a communicator and a processor. The communicator wirelessly communicates with another wireless communication device. The processor controls the communicator to send an advertisement to the another wireless communication device at a predetermined time interval. The advertisement includes identification information identifying the wireless communication device. The processor changes sending settings on the basis of elapsed time from a start of the sending of the identification information.

4 Claims, 7 Drawing Sheets

(51) Int. Cl.
*G04R 20/26* (2013.01)
*H04W 4/80* (2018.01)
*H04W 52/02* (2009.01)

(52) U.S. Cl.
CPC ............ *H04W 52/288* (2013.01); *H04W 4/80* (2018.02); *H04W 52/0216* (2013.01)

(58) Field of Classification Search
CPC .............. H04W 52/0287; H04W 88/02; G04R 20/26; G04G 21/04
See application file for complete search history.

(56) References Cited

U.S. PATENT DOCUMENTS

| | | | |
|---|---|---|---|
| 9,848,457 B1* | 12/2017 | Yae | H04W 76/14 |
| 10,082,554 B1* | 9/2018 | de la Broise | G01S 19/34 |
| 2014/0328210 A1* | 11/2014 | Knaappila | H04W 4/80 |
| | | | 370/254 |
| 2014/0365953 A1* | 12/2014 | Zambetti | G06F 3/0481 |
| | | | 715/784 |
| 2015/0085726 A1* | 3/2015 | Terai | H04W 52/18 |
| | | | 370/311 |
| 2015/0341971 A1* | 11/2015 | Fodor | H04W 56/001 |
| | | | 370/280 |
| 2017/0280276 A1* | 9/2017 | Inoue | H04W 4/50 |
| 2018/0006746 A1* | 1/2018 | Yasuzaki | H04N 1/32101 |
| 2019/0014366 A1* | 1/2019 | Igarashi | H04N 21/4314 |
| 2019/0098445 A1* | 3/2019 | Hu | H04W 4/02 |
| 2019/0387473 A1* | 12/2019 | Lang | G07C 9/00309 |

FOREIGN PATENT DOCUMENTS

| | | |
|---|---|---|
| JP | 2016-174304 A | 9/2016 |
| JP | 2017-022644 A | 1/2017 |
| JP | 2017-118325 A | 6/2017 |
| KR | 10-1606039 B1 | 3/2016 |

OTHER PUBLICATIONS

Extended European Search Report dated Feb. 28, 2019 received in European Patent Application No. EP 18197288.6.

Notice of Reasons for Refusal dated May 18, 2021 received in Japanese Patent Application No. JP 2017-192660 together with an English language translation.

* cited by examiner

CONNECTION TYPE: MANUAL CONNECTION OR KEY TIME SYNCHRONIZATION

| ELAPSED TIME t [s] | 0 [s] < t ≤ 10 [s] | 10 [s] < t ≤ 20 [s] | 20 [s] < t ≤ 30 [s] | 30 [s] < t ≤ 60 [s] |
|---|---|---|---|---|
| ADVERTISING INTERVAL | 50[ms] | 200[ms] | 500[ms] | 1[s] |
| TRANSMISSION POWER | 0[dBm] | −5[dBm] | −10[dBm] | −15[dBm] |

FIG.3B

CONNECTION TYPE: AUTOMATIC TIME SYNCHRONIZATION

| ELAPSED TIME t [s] | 0 [s] < t ≤ 10 [s] | 10 [s] < t ≤ 20 [s] | 20 [s] < t ≤ 30 [s] |
|---|---|---|---|
| ADVERTISING INTERVAL | 500[ms] | 200[ms] | 50[ms] |
| TRANSMISSION POWER | −15[dBm] | −5[dBm] | 0[dBm] |

FIG.3C

CONNECTION TYPE: FIND ME

| ELAPSED TIME t [s], n=0 to 17 | $5 \times 2n$ [s] < t ≤ $5 \times (2n+1)$ [s] | $5 \times (2n+1)$ [s] < t ≤ $5 \times (2n+2)$ [s] |
|---|---|---|
| ADVERTISING INTERVAL | 500[ms] | 50[ms] |
| TRANSMISSION POWER | −15[dBm] | 0[dBm] |

FIG.6

WIRELESS COMMUNICATION DEVICE, ELECTRONIC TIMEPIECE, WIRELESS COMMUNICATION METHOD, AND STORAGE MEDIUM

CROSS-REFERENCE TO RELATED APPLICATION

This application claims the benefit of Japanese Patent Application No. 2017-192660, filed on Oct. 2, 2017, the entire disclosure of which is incorporated by reference herein.

FIELD

This application relates generally to a wireless communication device, an electronic timepiece, a wireless communication method, and a storage medium.

BACKGROUND

In wireless communication such as Bluetooth (registered trademark) Low Energy, one objective is to smoothly establish a connection between a master and a slave with low power consumption. To achieve this, there is a technique in which the master is trained to learn in advance the sending interval of identification information to be sent by the slave, thereby determining a suitable size of a receive window (see, for example, Unexamined Japanese Patent Application Kokai Publication No. 2012-142877).

In connection control such as that described in Unexamined Japanese Patent Application Kokai Publication No. 2012-142877, there are cases in which it is difficult to smoothly establish a connection between the master and the slave, depending on the connection environment such as the presence of ambient noise and the state of the device to be connected to. If the slave continues to send the identification information in such cases, power is needlessly consumed.

SUMMARY

In the present disclosure, a wireless communication device, an electronic timepiece, a wireless communication method, and a non-transitory computer-readable storage medium are described.

A wireless communication device according to one aspect of the present disclosure includes a communicator that wirelessly communicates with another wireless communication device, and a processor. The processor controls the communicator to send an advertisement to the another wireless communication device at a predetermined time interval. The advertisement includes identification information that identifies the wireless communication device. The processor changes sending settings on the basis of elapsed time from a start of the sending of the identification information.

BRIEF DESCRIPTION OF THE DRAWINGS

A more complete understanding of this application can be obtained when the following detailed description is considered in conjunction with the following drawings, in which.

DETAILED DESCRIPTION

Hereinafter, embodiments are described while referencing the drawings.

Figure 1:
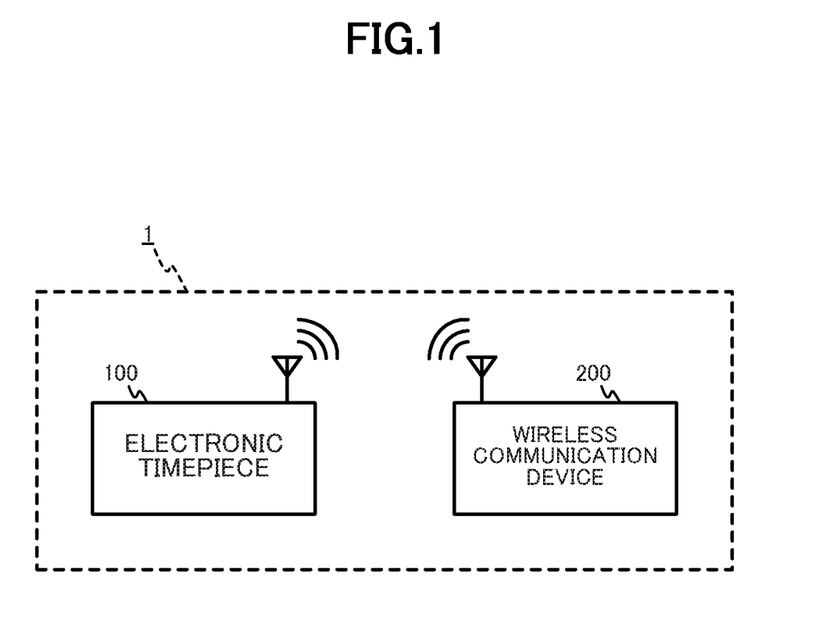
FIG. 1 is a drawing illustrating a configuration example of a wireless communication system according to an embodiment.

FIG. 1 is a drawing illustrating a configuration example of a wireless communication system 1 according to the present embodiment. In the configuration example illustrated in FIG. 1, the wireless communication system 1 includes an electronic timepiece 100 and a wireless communication device 200. The electronic timepiece 100 is an electronic device that is provided with time keeping functions and wireless communication functions, and wirelessly communicates with the wireless communication device 200 on the basis of a wireless communication standard such as Bluetooth (registered trademark) Low Energy (hereinafter referred to as "BLE"). The wireless communication device 200 is a portable electronic device provided with wireless communication functions. Examples of the wireless communication device 200 include a mobile phone, a smartphone, a personal computer (PC), a personal digital assistant (PDA), and a smart watch or other wearable device.

Next, the configuration of the electronic timepiece 100 according to the present embodiment is described.

Figure 2:
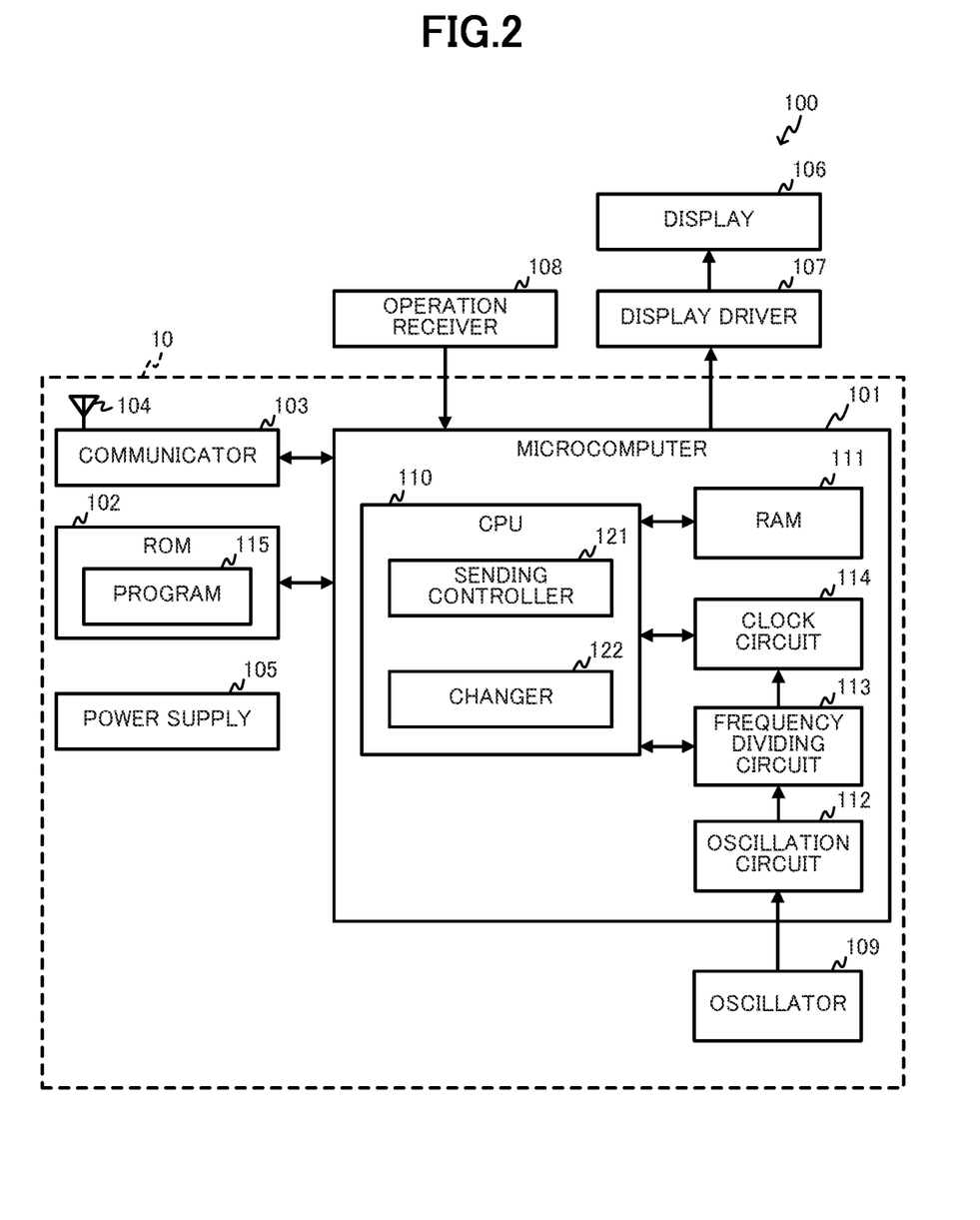
FIG. 2 is a block diagram illustrating a configuration of an electronic timepiece according to an embodiment.

FIG. 2 is a block diagram illustrating a configuration example of the electronic timepiece 100 according to the present embodiment. First, the hardware configuration of the electronic timepiece 100 according to the present embodiment is described. As illustrated in FIG. 2, the electronic timepiece 100 includes a microcomputer 101, read-only memory (ROM) 102, a communicator 103, an antenna 104, a power supply 105, a display 106, a display driver 107, an operation receiver 108, and an oscillator 109.

The microcomputer 101 includes a central processing unit (CPU) 110 as a processor, random access memory (RAM) 111 as a storage unit, an oscillation circuit 112, a frequency dividing circuit 113, and a clock circuit 114. Note that the RAM 111, the oscillation circuit 112, the frequency dividing circuit 113, and the clock circuit 114 are not limited to being provided in the microcomputer 101 and may be provided outside the microcomputer 101. Additionally, the ROM 102, the communicator 103, the power supply 105, the display driver 107, and the oscillator 109 are not limited to being provided outside the microcomputer 101 and may be provided in the microcomputer 101.

The CPU 110 is a processor that carries out various types of arithmetic processing and overall control of all operations of the electronic timepiece 100. The CPU 110 reads control programs from the ROM 102 and loads the control programs into the RAM 111 to carry out arithmetic controlling related to displaying and various types of functions, and various types of operation processing such as the display of the time. Additionally, the CPU 110 controls the communicator 103 to establish a connection with the wireless communication device 200 and carry out data communication.

The RAM 111 is volatile memory such as static random access memory (SRAM) or dynamic random access memory (DRAM). The RAM 111 provides working memory space to the CPU 110 store temporary data and store various types of setting data.

The oscillation circuit 112 causes the oscillator 109 to oscillate, thereby generating and outputting a predetermined frequency signal (clock signal). In one example, a crystal oscillator is used as the oscillation circuit 112.

The frequency dividing circuit 113 divides the frequency signal input from the oscillation circuit 112 into signals of frequencies to be used by the clock circuit 114 and the CPU 110, and outputs these signals. The frequencies of the output signals may be changed on the basis of settings set by the CPU 110.

The clock circuit 114 keeps the current time by counting the number of times a predetermined clock signal is input from the frequency dividing circuit 113, and adding this number to an initial value. The clock circuit 114 may be configured by software that changes a value stored in the RAM 111, or may be configured by a dedicated counter circuit. The time kept by the clock circuit 114 may be any of cumulative time from a predetermined timing, coordinated universal time (UTC), a preset local time, or the like. Additionally, the time kept by the clock circuit 114 need not be in a year-month-day-hour-minute-second format. Moreover, the time kept by the clock circuit 114 may be corrected by a time externally obtained by Wi-Fi (registered trademark) or the like.

A timer includes the oscillation circuit 112, the frequency dividing circuit 113, and the clock circuit 114.

Examples of the ROM 102 include mask ROM and rewritable nonvolatile memory. Control programs, initial setting data, and the like are stored in the ROM 102. The control programs include a program 115 related to the control of various types of processing described later.

In one example, the communicator 103 includes a radio frequency (RF) circuit and a baseband (BB) circuit, and a memory circuit. The communicator 103 demodulates and/or decrypts the radio signals received via the antenna 104, and sends these radio signals to the CPU 110. Moreover, the communicator 103 encrypts and/or modulates signals sent from the CPU 110 and sends these signals out via the antenna 104.

The power supply 105 includes a battery and supplies, to the components of the electronic timepiece 100, power for the operations of the electronic timepiece 100 at the operating voltage of the components. In the present embodiment, a secondary battery such as a lithium-ion battery is used as the battery of the power supply 105.

A wireless communication device 10 includes the microcomputer 101, the ROM 102, the communicator 103, the antenna 104, the power supply 105, and the oscillator 109.

In one example, a display 106 includes a display screen such as a liquid crystal display (LCD) or an organic electro luminescence (EL) display. The display driver 107 outputs, to the display 106, a driving signal corresponding to the type of display screen on the basis of a control signal from the CPU 110, and carries out displays on the display screen.

In one example, the operation receiver 108 includes keys or buttons, and receives input operations from a user and outputs electronic signals corresponding to the input operations to the CPU 110 as input signals. Additionally, a configuration is possible in which the operation receiver 108 is provided by laminating a touch sensor on the display screen of the display 106, thereby providing both a display screen and a touch panel. In this case, the touch sensor detects a contact position and/or a contact mode involved in a contact operation by the user on the touch sensor, and outputs an operation signal corresponding to the detected contact position and/or contact mode to the CPU 110.

Next, the functional configuration of the CPU 110 of the electronic timepiece 100 according to the present embodiment is described. As illustrated in FIG. 2, the CPU 110 functions as a sending controller 121 and a changer 122. The functions of the sending controller 121 and the changer 122 may be realized by a single CPU or may be each realized by its independent CPU. The functions of the sending controller 121 and the changer 122 may be realized by a processor other than that of the microcomputer 101. For example, the functions of the sending controller 121 and the changer 122 may be realized by a CPU of the communicator 103 or the like.

The CPU 110 as the sending controller 121 controls the communicator 103 to send an advertising packet to the wireless communication device 200 at a predetermined time interval (advertising interval). The advertising packet includes a device address, which is an example of identification information that identifies the device that sends the advertising packet. In the present embodiment, the advertising interval and the transmission power used in the sending of the advertising packet are set as described later, and the CPU 110 controls the communicator 103 to send the advertising packet to the wireless communication device 200 at the set advertising interval and transmission power. When the CPU 110 receives, from the communicator 103, a notification indicating that a connection request has been received from the wireless communication device 200, the CPU 110 establishes a connection with the wireless communication device 200. When the communicator 103 does not receive a connection request from the wireless communication device 200 within a set time, the sending of the advertising packet is terminated.

The CPU 110 as the changer 122 changes, for example, the advertising interval and the transmission power (the sending settings) on the basis of the elapsed time from the start of the sending of the advertising packet. In the present embodiment, the CPU 110 determines the connection category indicating the purpose of connecting to the wireless communication device 200, on the basis of an operation received from the user or a predetermined timing, and changes the advertising interval and the transmission power on the basis of the determined connection category and the elapsed time. For example, in the present embodiment, the following four connection categories are preset:

(1) Manual connection: Connection for when the user operates the electronic timepiece 100 to connect to the wireless communication device 200, or for when the user operates the wireless communication device 200 to connect to the electronic timepiece 100;

(2) KEY time synchronization: Connection for synchronizing the time by correcting the time of the electronic timepiece 100 to the time of the wireless communication device 200, wherein the synchronization is triggered by a operation received from the user;

(3) Automatic time synchronization: Connection for synchronizing the time by correcting the time of the electronic timepiece 100 to the time of the wireless communication device 200 at a preset timing (for example, at a predetermined time of each day); and (4) FIND ME (mobile search function): Connection in which the user operates the electronic timepiece 100 to search for a wireless communication device 200 located nearby.

In the present embodiment, the CPU 110 determines which of the connection categories (1) to (4) the connection category is, on the basis of an operation received from the user or a predetermined timing. For example, when the user presses and holds a button of the electronic timepiece 100, the CPU 110 determines that the connection category is manual connection, and when the user presses and immediately releases the button, the CPU 110 determines that the connection category is KEY time synchronization. In another example, when the start of a connection sequence is triggered by the arrival of the predetermined time, the CPU 110 determines that the connection category is automatic time synchronization.

Figure 3A:
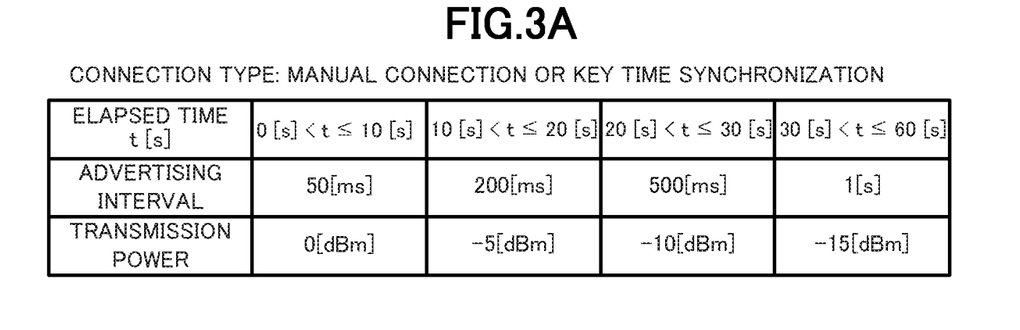
FIG. 3A is a table illustrating an example of data representing the advertising interval and the transmission power, for the connection category being manual connection or KEY time synchronization.
Figure 3B:
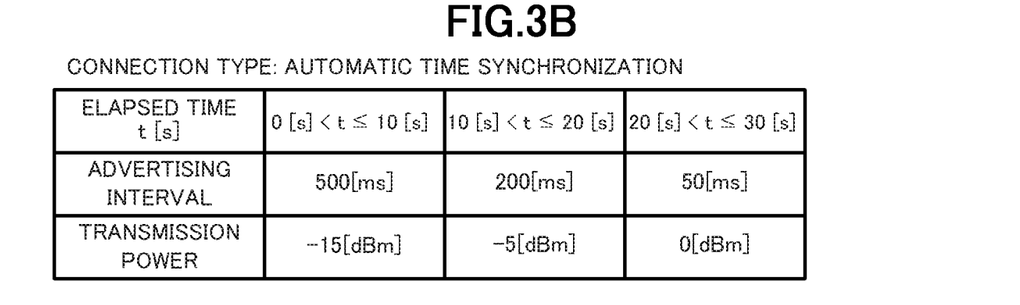
FIG. 3B is a table illustrating an example of data representing the advertising interval and the transmission power, for the connection category being automatic time synchronization.
Figure 3C:
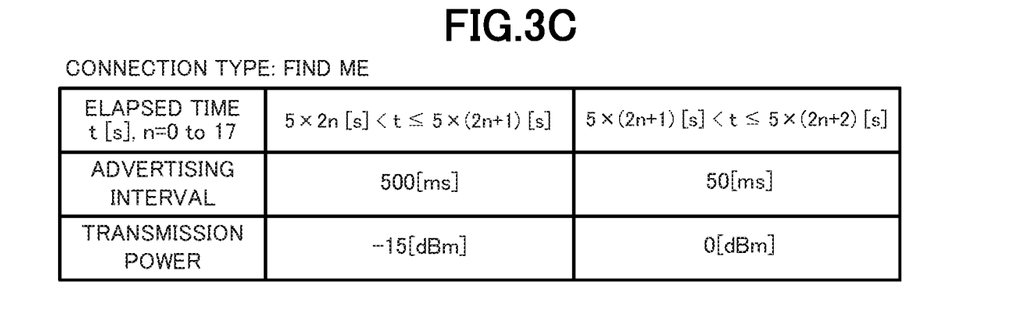
FIG. 3C is a table illustrating an example of data representing the advertising interval and the transmission power, for the connection category being FIND ME.

In the present embodiment, the CPU 110 sets the advertising interval and the transmission power as illustrated in FIGS. 3A, 3B, and 3C according to the determined connection category and the elapsed time from the start of the sending of the advertising packet.

FIG. 3A is an example of data representing the advertising interval and the transmission power, for the connection category being manual connection or KEY time synchronization. In the example illustrated in FIG. 3A, longer elapsed times result in longer advertising intervals and smaller transmission power. In a case in which the user selects manual connection or KEY time synchronization, it is likely that the user desires to establish a connection between the electronic timepiece 100 and the wireless communication device 200 as quickly as possible and synchronize the time, and/or desires to operate the settings of the electronic timepiece 100. Accordingly, rapid and smooth connection is enabled by sending the advertising packet at as great a transmission power and as short an advertising interval as possible at the initial stage, that is, at the start of the sending of the advertising packet. By reducing the transmission power and lengthening the advertising interval as the elapsed time increases, the sending of the advertising packet is continued at low power. When the electronic timepiece 100 does not receive a connection request from the wireless communication device 200 even when the elapsed time exceeds 60 [s] due to the wireless communication device 200 not being located near the electronic timepiece 100 or the wireless communication device 200 being powered off, the electronic timepiece 100 stops the sending of the advertising packet.

FIG. 3B is an example of data representing the advertising interval and the transmission power, for the connection category being automatic time synchronization. In the example illustrated in FIG. 3B, longer elapsed times result in shorter advertising intervals and greater transmission power. The automatic time synchronization is a feature that does not involve the user and, as such, it is preferable that the connection be established with the lowest power consumption possible, even if a longer amount of time is required. Accordingly, connection with lower power consumption is enabled by sending the advertising packet at as low a transmission power and as long an advertising interval as possible at the initial stage, that is, at the start of the sending of the advertising packet, and gradually increasing the transmission power and shortening the advertising interval. Even if the advertising packet is sent needlessly for an extended period of time, the user cannot be expected to bring the wireless communication device 200 to a location near the electronic timepiece 100 and, as such, the advertising packet is not sent for an extended period of time. In the present embodiment, when the electronic timepiece 100 does not receive a connection request from the wireless communication device 200 even when the elapsed time exceeds 30 [s], the electronic timepiece 100 stops the sending of the advertising packet.

FIG. 3C is an example of data representing the advertising interval and the transmission power, for the connection category being FIND ME. In the example illustrated in FIG. 3C, a first pattern and a second pattern are changed in an alternating manner every 5 [s] (predetermined period). In the first pattern, the advertising interval is 500 [ms] (first time interval) and the transmission power is −15 [dBm] (first power), and in the second pattern, the advertising interval is 50 [ms] (second time interval) that is shorter than the first time interval and the transmission power is 0 [dBm] (second power) that is greater than the first power. Specifically, the advertising interval and the transmission power are changed in an alternating manner for 180 [s] between the first pattern where $5×2$ n[s]<t≤5×(2n+1) [s] and the second pattern where 5×(2n+1) [s]<t≤5×(2n+2) [s], where n is an integer of 0 to 17. In FIND ME, it is expected that the user will carry the electronic timepiece 100 around while searching for the wireless communication device 200. As such, the electronic timepiece 100 sends the advertising packet, alternating between the first pattern in which the transmission power is low and the advertising interval is long and the second pattern in which the transmission power is high and the advertising interval is short. Since FIND ME is not a function that is used on a daily basis, advertising is carried out for an extended period of time. In the present embodiment, when the electronic timepiece 100 does not receive a connection request from the wireless communication device 200 even when the elapsed time exceeds 180 [s], the electronic timepiece 100 stops the sending of the advertising packet.

Note that the various setting values illustrated in FIGS. 3A, 3B, and 3C may be stored, in advance, in the ROM 102 or the like of the electronic timepiece 100, or may be acquired, in advance, from the wireless communication device 200. The various setting values are not limited to those illustrated in the drawings and may be set as desired.

Figure 4:
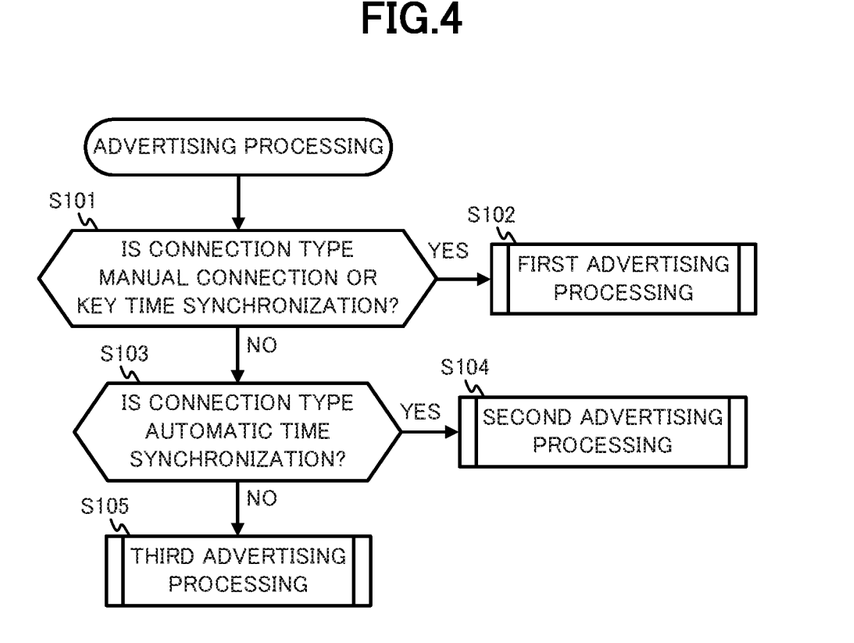
FIG. 4 is a flowchart illustrating an example of operations of advertising processing, executed by the CPU of the electronic timepiece, according to an embodiment.

FIG. 4 is a flowchart illustrating an example of operations of advertising processing, executed by the CPU 110 of the electronic timepiece 100, according to the present embodiment. In one example, the CPU 110 of the electronic timepiece 100 starts the advertising processing illustrated in FIG. 4 upon the receipt, via the operation receiver 108, of an advertising start command or when triggered by the arrival of a predetermined time.

First, the CPU 110 determines whether the connection category of the connection sequence currently being executed is manual connection or KEY time synchronization (step S101). When the connection category is manual connection or KEY time synchronization (step S101; Yes), the CPU 110 executes a first advertising processing (step S102).

Figure 5:
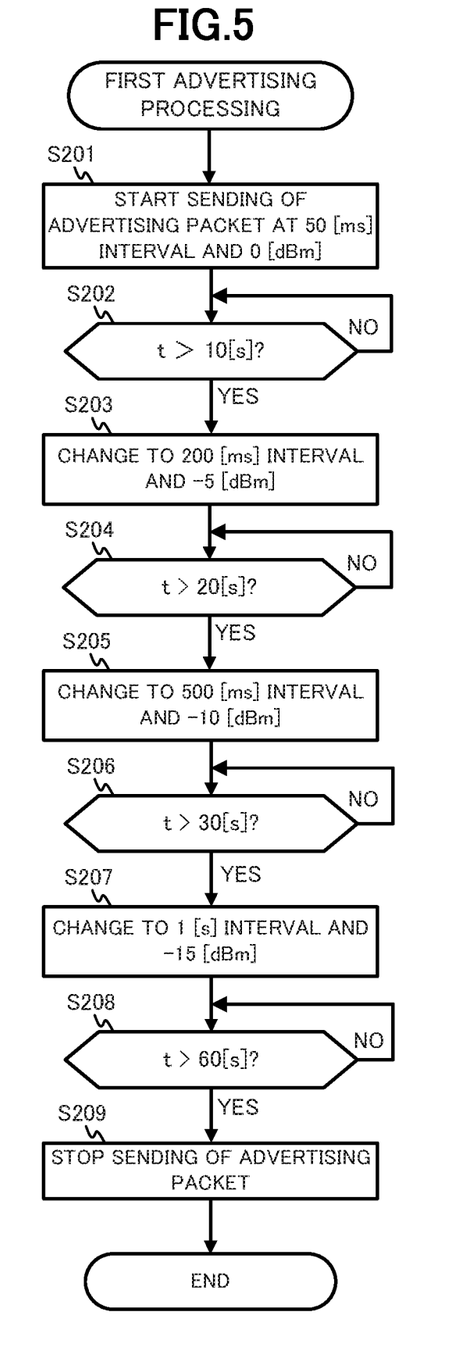
FIG. 5 is a flowchart illustrating an example of operations of a first advertising processing, executed by the CPU of the electronic timepiece, according to an embodiment.

FIG. 5 is a flowchart illustrating an example of operations of the first advertising processing, executed by the CPU 110 of the electronic timepiece 100, according to the present embodiment. First, the CPU 110 controls the communicator 103 to start the sending of the advertising packet at an advertising interval of 50 [ms] and a transmission power of 0 [dBm] (step S201). The CPU 110 starts the count of an elapsed time t together with the starting of the sending of the advertising packet.

Then, the CPU 110 determines whether the elapsed time t is greater than 10 [s] (step S202). When the elapsed time t is less than or equal to 10 [s] (step S202; No), the CPU 110 waits until the elapsed time t exceeds 10 [s]. When the elapsed time t is greater than 10 [s] (step S202; Yes), the CPU 110 controls the communicator 103 to change the advertising interval to 200 [ms] and the transmission power to −5 [dBm] (step S203).

Then, the CPU 110 determines whether the elapsed time t is greater than 20 [s] (step S204). When the elapsed time t is less than or equal to 20 [s] (step S204; No), the CPU 110 waits until the elapsed time t exceeds 20 [s]. When the elapsed time t is greater than 20 [s] (step S204; Yes), the CPU 110 controls the communicator 103 to change the advertising interval to 500 [ms] and the transmission power to −10 [dBm] (step S205).

Then, the CPU 110 determines whether the elapsed time t is greater than 30 [s] (step S206). When the elapsed time t is less than or equal to 30 [s] (step S206; No), the CPU 110 waits until the elapsed time t exceeds 30 [s]. When the elapsed time t is greater than 30 [s] (step S206; Yes), the CPU 110 controls the communicator 103 to change the advertising interval to 1 [s] and the transmission power to −15 [dBm] (step S207).

Then, the CPU 110 determines whether the elapsed time t is greater than 60 [s] (step S208). When the elapsed time t is less than or equal to 60 [s] (step S208; No), the CPU 110 waits until the elapsed time t exceeds 60 [s]. When the elapsed time t is greater than 60 [s] (step S208; Yes), the CPU 110 stops the sending of the advertising packet (step S209) and ends the processing.

Returning to FIG. 4, when the connection category is not manual connection or KEY time synchronization (step S101; No), the CPU 110 determines whether the connection category of the connection sequence currently being executed is automatic time synchronization (step S103). When the connection category is automatic time synchronization (step S103; Yes), the CPU 110 executes a second advertising processing (step S104).

Figure 6:
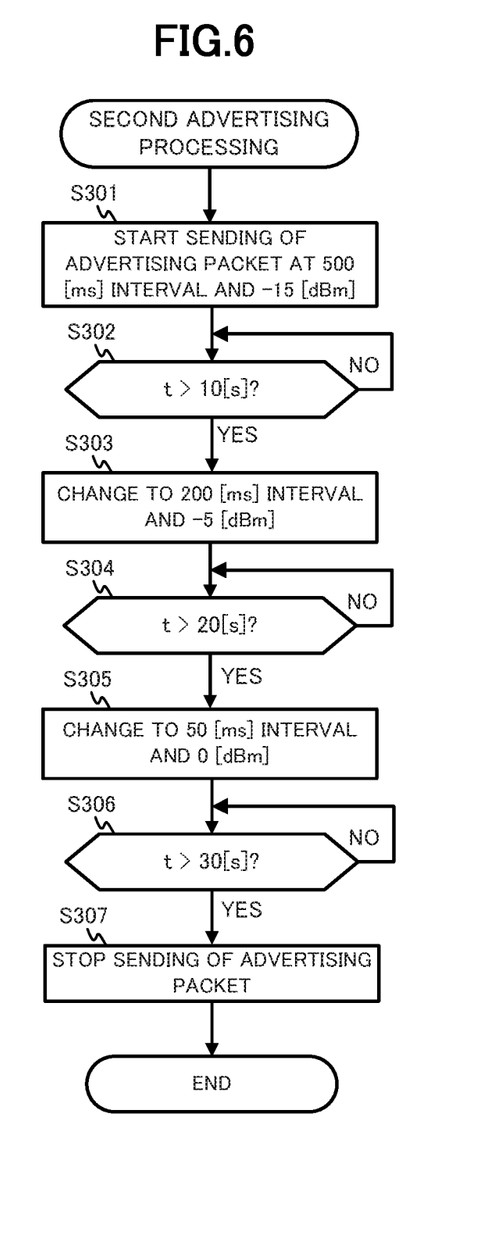
FIG. 6 is a flowchart illustrating an example of operations of a second advertising processing, executed by the CPU of the electronic timepiece, according to an embodiment.

FIG. 6 is a flowchart illustrating an example of operations of the second advertising processing, executed by the CPU 110 of the electronic timepiece 100, according to the present embodiment. First, the CPU 110 controls the communicator 103 to start the sending of the advertising packet at an advertising interval of 500 [ms] and a transmission power of −15 [dBm] (step S301). The CPU 110 starts the count of an elapsed time t together with the starting of the sending of the advertising packet.

Then, the CPU 110 determines whether the elapsed time t is greater than 10 [s] (step S302). When the elapsed time t is less than or equal to 10 [s] (step S302; No), the CPU 110 waits until the elapsed time t exceeds 10 [s]. When the elapsed time t is greater than 10 [s] (step S302; Yes), the CPU 110 controls the communicator 103 to change the advertising interval to 200 [ms] and the transmission power to −5 [dBm] (step S303).

Then, the CPU 110 determines whether the elapsed time t is greater than 20 [s] (step S304). When the elapsed time t is less than or equal to 20 [s] (step S304; No), the CPU 110 waits until the elapsed time t exceeds 20 [s]. When the elapsed time t is greater than 20 [s] (step S204; Yes), the CPU 110 controls the communicator 103 to change the advertising interval to 50 [ms] and the transmission power to 0 [dBm] (step S305).

Then, the CPU 110 determines whether the elapsed time t is greater than 30 [s] (step S306). When the elapsed time t is less than or equal to 30 [s] (step S306; No), the CPU 110 waits until the elapsed time t exceeds 30 [s]. When the elapsed time t is greater than 30 [s] (step S306; Yes), the CPU 110 stops the sending of the advertising packet (step S307) and ends the processing.

Returning to FIG. 4, when the connection category is not automatic time synchronization (step S103; No), the CPU 110 determines that the connection category of the connection sequence currently being executed is FIND ME, and executes a third advertising processing (step S105).

Figure 7:
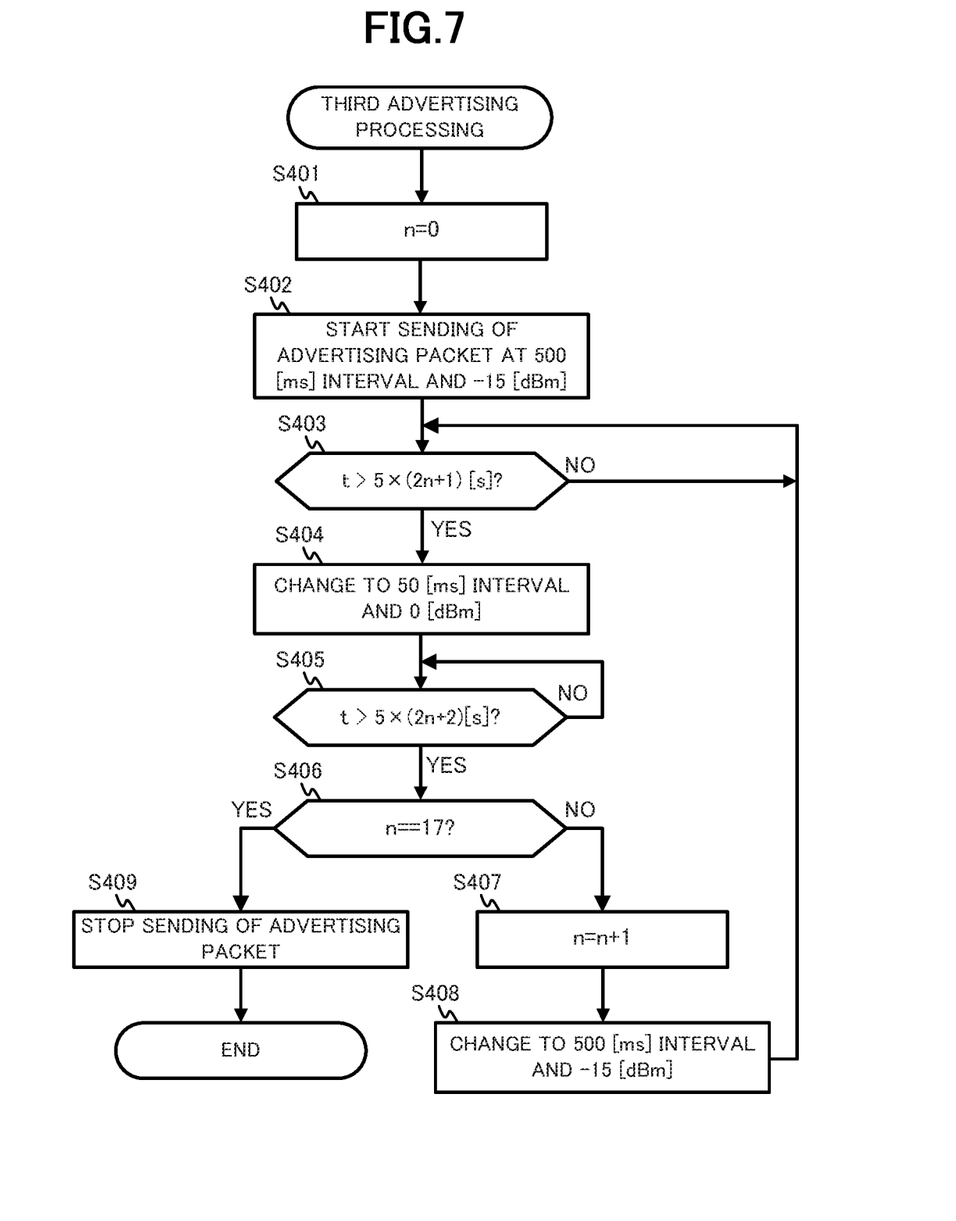
FIG. 7 is a flowchart illustrating an example of operations of a third advertising processing, executed by the CPU of the electronic timepiece, according to an embodiment.

FIG. 7 is a flowchart illustrating an example of operations of the third advertising processing, executed by the CPU 110 of the electronic timepiece 100, according to the present embodiment. First, the CPU 110 sets an initial value of the counter n to 0 (step S401). Here, the counter n is for counting the number of repetitions of the first pattern and the second pattern. Then, the CPU 110 controls the communicator 103 to start the sending of the advertising packet at an advertising interval of 500 [ms] and a transmission power of −15 [dBm] (step S402). The CPU 110 starts the count of an elapsed time t together with the starting of the sending of the advertising packet.

Then, the CPU 110 determines whether the elapsed time t is greater than $5\times(2n+1)$ [s] (step S403). When the elapsed time t is less than or equal to $5\times(2n+1)$ [s] (step S403; No), the CPU 110 waits until the elapsed time t exceeds $5\times(2n+1)$ [s]. When the elapsed time t is greater than $5\times(2n+1)$ [s] (step S403; Yes), the CPU 110 controls the communicator 103 to change the advertising interval to 50 [ms] and the transmission power to 0 [dBm] (step S404).

Then, the CPU 110 determines whether the elapsed time t is greater than $5\times(2n+2)$ [s] (step S405). When the elapsed time t is less than or equal to $5\times(2n+2)$ [s] (step S405; No), the CPU 110 waits until the elapsed time t exceeds $5\times(2n+2)$ [s]. When the elapsed time t is greater than $5\times(2n+2)$ [s] (step S405; Yes), the CPU 110 determines whether the counter n is 17 (step S406).

When the counter n is not 17 (step S406; No), the CPU 110 increments the n (step S407) and controls the communicator 103 to change the advertising interval to 500 [ms] and the transmission power to −15 [dBm] (step S408). Thereafter, the CPU 110 returns to the processing of step S403. When the counter n is 17 (step S406; Yes), the CPU 110 stops the sending of the advertising packet (step S409) and ends the processing.

Note that, upon the receipt of a connection request from the wireless communication device 200 during the execution of the first to third advertising processings described above, the CPU 110 stops the sending of the advertising packet and ends the first to third advertising processings.

As described above, the CPU 110 of the electronic timepiece 100 according to the present embodiment changes the advertising interval and the transmission power on the basis of the elapsed time from the start of the sending of the advertising packet. As such, depending on the connection environment of the wireless communication device 200, it is possible to establish a connection with the wireless communication device 200 in a smoother and more power efficient manner.

The CPU 110 of the electronic timepiece 100 according to the present embodiment determines the connection category indicating the purpose of connecting to the wireless communication device 200, on the basis of an operation received from the user or a predetermined timing, and changes the advertising interval and the transmission power on the basis of the determined connection category and the elapsed time. As such, it is possible determine the appropriate advertising interval and transmission power according to the connection category desired by the user and, therefore it is possible to establish a connection with the wireless communication device 200 in a smoother and more power efficient manner.

With the CPU 110 of the electronic timepiece 100 according to the present embodiment, longer elapsed times result in longer advertising intervals and smaller transmission power. Accordingly, when the user desires to quickly establish a connection between the electronic timepiece 100 and the wireless communication device 200 as in a case in which the connection category is manual connection or KEY time synchronization, such a connection is enabled by sending the advertising packet at as great a transmission power and as short an advertising interval as possible at the initial stage, that is, at the start of the sending of the advertising packet. By reducing the transmission power and lengthening the advertising interval as the elapsed time increases, the sending of the advertising packet can be continued at low power.

Additionally, with the CPU 110 of the electronic timepiece 100 according to the present embodiment, longer elapsed times result in shorter advertising intervals and larger transmission power. Accordingly, when the electronic timepiece 100 automatically connects to the wireless communication device 200 at the predetermined timing without involving the user as in a case in which the connection category is automatic time synchronization, a connection to the wireless communication device 200 can be established with lower power consumption by sending the advertising packet at as low a transmission power and as long an advertising interval as possible at the initial stage, that is, at the start of the sending of the advertising packet, and gradually increasing the transmission power and shortening the advertising interval.

The CPU 110 of the electronic timepiece 100 according to the present embodiment changes between the first pattern and the second pattern in an alternating manner every predetermined period. In the first pattern, the advertising interval is the first time interval and the transmission power is the first power, and in the second pattern, the advertising interval is the second time interval that is shorter than the first time interval and the transmission power is the second power that is greater than the first power. Accordingly, when the user carries the electronic timepiece 100 around while searching for the wireless communication device 200 as in a case in which the connection category is FIND ME, the electronic timepiece 100 sends the advertising packet while changing between the first pattern and the second pattern in an alternating manner. As a result, a connection can be established between the electronic timepiece 100 and the wireless communication device 200 at low power.

In the embodiment described above, an example is described in which the electronic timepiece 100 and the wireless communication device 200 communicate with each other via Bluetooth (registered trademark). However, the electronic timepiece 100 and the wireless communication device 200 may communicate with each other via a different communication method such as, for example, a wireless local area network (LAN) or Wi-Fi (registered trademark).

In the embodiment described above, an example is described for the electronic timepiece 100. However, the present disclosure is not limited thereto and any electronic device capable of wireless communication may be used. The present disclosure is particularly suitable for a portable electronic device that has a battery with a comparatively small capacity, such as the electronic timepiece 100.

Additionally, in the embodiment described above, an example is described in which the CPU 110 carries out the control operations. However, the control operations are not limited to software control by the CPU. Part or all of the control operations may be realized using hardware components such as dedicated logic circuits.

Additionally, in the foregoing description, an example is described in which the ROM 102 that is nonvolatile memory such as flash memory, is used as the computer-readable medium on which the program related to the data communication processing and the program related to the advertising processings of the present disclosure are stored. However, the computer-readable medium is not limited thereto, and a portable recording medium such as a hard disk drive (HDD), a compact disc read-only memory (CD-ROM), or a digital versatile disc (DVD) may be used. Additionally, a carrier wave may be used in the present disclosure as the medium to provide, over a communication line, the data of the program of the present disclosure.

In addition, the specific details such as the configurations, the control procedures, and the display examples described in the embodiments may be appropriately modified without departing from the scope of the present disclosure.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:
1. A wireless communication device comprising:
a communicator configured to wirelessly communicate with another wireless communication device; and
a processor configured to:
control the communicator to start sending a plurality of advertisements to the another wireless communication device, wherein the plurality of advertisements include identification information that identifies the wireless communication device;
determine an elapsed time from the start of the sending of the plurality of advertisements;
determine whether the elapsed time from the start of the sending of the plurality of advertisements exceeds predetermined time points;
select a connection category from a plurality of connection categories, the connection category selected indicating a purpose of connecting to the another wireless communication device, on the basis of an operation received from a user or a predetermined time, wherein the plurality of connection categories consists of:
a first connection category for when the user operates the wireless communication device to connect to the another wireless communication device;
a second connection category for synchronizing time by correcting a time measured by the wireless communication device to time measured by the another wireless communication device, where synchronizing is triggered by an operation received from the user;
a third connection category for synchronizing time by correcting the time measured by the wireless communication device to the time measured by the another wireless communication device, where synchronizing occurs at a preset timing; and
a fourth connection category in which the user operates the wireless communication device to search for the another wireless communication device;
on the basis of selecting the first connection category or the second connection category, lengthen a time interval between sending of successive advertisements and reduce a transmission power used in sending the successive advertisements between the predetermined time points as the elapsed time determined increases;
on the basis of selecting the third connection category, shorten a time interval between sending of successive advertisements and increase a transmission power used in sending the successive advertisements between the predetermined time points as the elapsed time determined increases; and
on the basis of selecting the fourth connection category, switch between a first pattern and a second pattern of sending of successive advertisements between the predetermined time points as the elapsed time determined increases, the first pattern being a first time interval between sending of successive advertisements and a first transmission power used in sending the successive advertisements in the first pattern, and the second pattern being a second time interval between sending of successive advertisements and a second transmission power used in sending the successive advertisements in the second pattern, where the second time interval is longer than the first time interval and the second transmission power is lower than the first transmission power.

2. An electronic timepiece comprising:
the wireless communication device according to claim 1;
a clock circuit configured to keep current time; and
a display configured to display the current time kept by the clock circuit.

3. A method executed by a wireless communication device comprising a communicator that wirelessly communicates with another wireless communication device, the method comprising:
controlling the communicator to start sending a plurality of advertisements to the another wireless communication device, wherein the plurality of advertisements include identification information that identifies the wireless communication device;
determining an elapsed time from the start of the sending of the plurality of advertisements;
determining whether the elapsed time from the start of the sending of the plurality of advertisements exceeds predetermine time points;
selecting a connection category from a plurality of connection categories, the connection category selected indicating a purpose of connecting to the another wireless communication device, on the basis of an operation received from a user or a predetermined time, wherein the plurality of connection categories consists of:
a first connection category for when the user operates the wireless communication device to connect to the another wireless communication device;
a second connection category for synchronizing time by correcting a time measured by the wireless communication device to time measured by the another wireless communication device, where synchronizing is triggered by an operation received from the user;
a third connection category for synchronizing time by correcting the time measured by the wireless communication device to the time measured by the another wireless communication device, where synchronizing occurs at a preset timing; and
a fourth connection category in which the user operates the wireless communication device to search for the another wireless communication device;
on the basis of selecting the first connection category or the second connection category, lengthening a time interval between sending of successive advertisements and reducing a transmission power used in sending the successive advertisements between the predetermined time points as the elapsed time determined increases;
on the basis of selecting the third connection category, shortening a time interval between sending of successive advertisements and increasing a transmission power used in sending the successive advertisements between the predetermined time points as the elapsed time determined increases; and
on the basis of selecting the fourth connection category, switching between a first pattern and a second pattern of sending of successive advertisements between the predetermined time points as the elapsed time determined increases, the first pattern being a first time interval between sending of successive advertisements and a first transmission power used in sending the successive advertisements in the first pattern, and the second pattern being a second time interval between sending of successive advertisements and a second transmission power used in sending the successive advertisements in the second pattern, where the second time interval is longer than the first time interval and the second transmission power is lower than the first transmission power.

4. A non-transitory computer-readable storage medium storing a program for controlling a wireless communication device comprising a communicator that wirelessly communicates with another wireless communication device, the program causing a computer to at least:
control the communicator to start sending a plurality of advertisements to the another wireless communication device, wherein the plurality of advertisements include identification information that identifies the wireless communication device;
determine an elapsed time from the start of the sending of the plurality of advertisements;
determine whether the elapsed time from the start of the sending of the plurality of advertisements exceeds predetermined time points;
select a connection category from a plurality of connection categories, the connection category selected indicating a purpose of connecting to the another wireless communication device, on the basis of an operation received from a user or a predetermined time, wherein the plurality of connection categories consists of:

a first connection category for when the user operates the wireless communication device to connect to the another wireless communication device;
a second connection category for synchronizing time by correcting a time measured by the wireless communication device to time measured by the another wireless communication device, where synchronizing is triggered by an operation received from the user;
a third connection category for synchronizing time by correcting the time measured by the wireless communication device to the time measured by the another wireless communication device, where synchronizing occurs at a preset timing; and
a fourth connection category in which the user operates the wireless communication device to search for the another wireless communication device;
on the basis of selecting the first connection category or the second connection category, lengthen a time interval between sending of successive advertisements and reduce a transmission power used in sending the successive advertisements between the predetermined time points as the elapsed time determined increases;
on the basis of selecting the third connection category, shorten a time interval between sending of successive advertisements and increase a transmission power used in sending the successive advertisements between the predetermined time points as the elapsed time determined increases; and
on the basis of selecting the fourth connection category, switch between a first pattern and a second pattern of sending of successive advertisements between the predetermined time points as the elapsed time determined increases, the first pattern being a first time interval between sending of successive advertisements and a first transmission power used in sending the successive advertisements in the first pattern, and the second pattern being a second time interval between sending of successive advertisements and a second transmission power used in sending the successive advertisements in the second pattern, where the second time interval is longer than the first time interval and the second transmission power is lower than the first transmission power.

* * * * *